F. N. NUTT.
FLEXIBLE COUPLING.
APPLICATION FILED NOV. 27, 1912.

1,089,859.

Patented Mar. 10, 1914.

Witnesses:
P. H. Poole
Eugene C. Warr

Inventor:
Frank N. Nutt.
by Poole & Crouer
Attys.

UNITED STATES PATENT OFFICE.

FRANK N. NUTT, OF KOKOMO, INDIANA, ASSIGNOR TO THE HAYNES AUTOMOBILE COMPANY, OF KOKOMO, INDIANA, A CORPORATION OF INDIANA.

FLEXIBLE COUPLING.

1,089,859.  Specification of Letters Patent.  Patented Mar. 10, 1914.

Application filed November 27, 1912. Serial No. 733,773.

*To all whom it may concern:*

Be it known that I, FRANK N. NUTT, a citizen of the United States, and a resident of Kokomo, in the county of Howard and State of Indiana, have invented certain new and useful Improvements in Flexible Couplings; and I, FRANK N. NUTT, do hereby declare that the following is a full, clear, and exact description thereof, reference being had to the accompanying drawings, and to the letters of reference marked thereon, which form a part of this specification.

This invention relates to improvements in flexible couplings and more particularly to that class of flexible couplings adapted to transmit a rotative movement from one shaft to another and to compensate for any variations in alinement of the said shafts.

The principal object of the invention is to provide a simple, economical and efficient flexible coupling for shafts.

A further object of the invention is to provide a flexible coupling which is simple in construction, having no parts which are bodily movable with relation to each other in operation and which is adjustable and adapted to properly connect the ends of shafts at different or varying distances from each other or at an angle with respect to each other. This type of coupling is especially applicable for connecting the magneto shaft and the cam shaft of an automobile motor, although it may be used in any other similar capacity.

The invention consists in the features, combinations and details of construction hereinafter described and more particularly pointed out in the appended claims.

Figure 1:
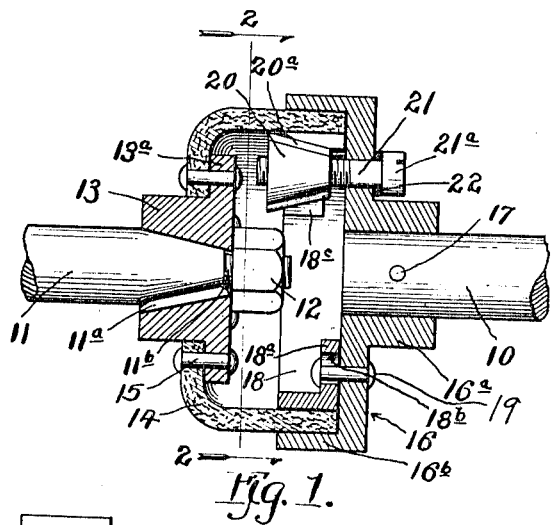
Figure 3:
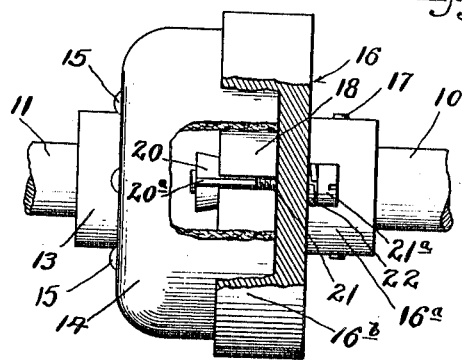
Figure 4:
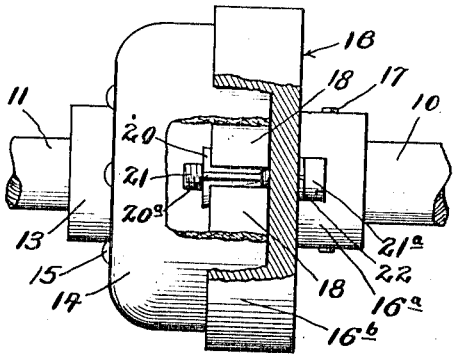
Figure 2:
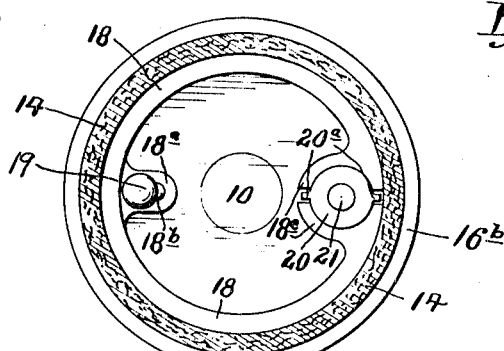

In the drawings Figure 1 is a central, longitudinal, sectional view of my improved flexible coupling, showing shafts flexibly connected thereby; Fig. 2 is a cross-sectional view taken on line 2—2 of Fig. 1; Fig. 3 is a view in elevation of my improved coupling with parts broken away to show the position of the expansion bolt when the expansion or inner clamping member is in unlocked position; and Fig. 4 is a similar view showing the position of the expansion bolt when the expansion shoe or inner clamping member is in its locked or clamping position.

In constructing a flexible coupling in accordance with my invention, and shafts provided therewith and connected thereby, I provide a driving shaft 10, which may be in the form of a cam shaft of an automobile motor, terminating a short distance from a driven shaft 11, which may be the armature shaft of a magneto. The shafts are preferably parallel and in alinement, although it is not in all instances essential that they be so related, in either of these respects, but only approximately so. Rigidly secured to the tapered extremity of the shaft 11 by means of a key 11ª and a nut 12 having screw-threaded engagement with the inner end portion 11ᵇ of the said shaft 11, is a collar 13 provided with an annular peripheral portion or flange 13ª. A cup-shaped, flexible coupling member in the form of a sleeve 14, formed, by preference, of leather or of similar flexible material, is secured to the said collar 13, by means of a plurality of rivets 15, passing through the flange 13ª and the inwardly extending portion of the flexible sleeve 14. The said flexible sleeve 14 is provided with a central aperture, through which extends the said collar 13 or the shaft 11 or both the shaft and collar, in such a manner that the portion of said sleeve adjacent to its aperture abuts against the periphery of the collar 13 and incloses the flange 13ª within the sleeve or flexible coupling member.

Mounted upon and preferably in fixed relation to the shaft 10 is a flanged or cup-shaped metallic coupling member or disk 16 provided with a hub 16ª through which the shaft 10 extends. A pin 17 serves to secure the flanged coupling member 16 in position upon said shaft. The periphery of the flanged disk 16 is provided with a flange or peripheral wall portion 16ᵇ extending from the face of the disk in the direction of the shaft 11, and parallel to and concentric with the shaft 10. This flange encircles the flexible, peripheral wall of the flexible sleeve 14.

Mounted upon the inside of the disk 16 and concentric with the flange 16ᵇ is an inner clamping member or expanding shoe or ring 18, the periphery of which is in clamping engagement with the inner surface or peripheral wall or flexible cylindrical portion of the flexible coupling member 14, so as to securely hold said flexible peripheral wall clamped between said inner clamping member and the flange or peripheral wall 16ᵇ of the coupling member 16 when the inner clamping member or ring is expanded. This inner clamping member 18 is provided with an inner securing portion 18ª adjacent to the face of the coupling member 16, and provided with a slot 18ᵇ. Through the said slot 18ᵇ and the face of the disk or coupling member 16 extends a headed screw or rivet 19 which secures said inner clamping member or shoe 18 to the face of the disk 16, in such a manner as to permit a slight movement of the said expanding shoe relative to the disk during the assembling of the parts, said movement being limited by the walls of the slot 18ᵇ. The expanding shoe or inner clamping member 18 is split or slitted so as to form an expansible and compressible annular clamping member or split ring, the adjacent end portions 18ᶜ of which are so constructed as to form opposite tapered walls of a tapered or conical aperture therebetween. The inner surfaces of these adjacent end portions of the split ring or inner clamping member 18 are so inclined as to form a yielding tapered seat having its smaller end adjacent to the disk, and in engagement with this seat and between said end portions of the clamping member or split ring is mounted a similarly tapered or conical collar 20, having its smaller end adjacent to the disk 16. Said tapered or conical collar is provided with longitudinal, lateral ribs 20ª diametrically opposite each other, which extend between the adjacent ends of the split ring or inner clamping member 18 in position to project laterally beyond the tapered or conical seat portion, and prevent the tapered collar 20 from rotating upon its seat. A bolt 21 extends through and preferably in screw-threaded engagement with the conical collar 20 and through the disk or clamping member 16 and is provided with a slotted head 21ª lying preferably outside of the coupler member 16. A split ring washer 22 is interposed between the head 21ª and the outer face of the disk 16, for preventing the accidental rotation of the bolt or screw.

The purpose of the inner clamping member 18 and the tapered collar 20 and bolt 21 is to clamp the coupler members 16 and 14 together and in such a manner as to permit the member 14 to be readily disconnected from the flanged disk 16, or, in other words, to couple and uncouple the coupler members 14 and 16 and thereby couple and uncouple the shafts 11 and 10. A further purpose is to enable the coupling members 14 and 16 fixed to shafts 11 and 10 to be adjusted so as to properly connect the shafts 10 and 11 with their ends at varying distances from each other or in such relation to each other as conditions may require. To secure the flexible coupling member in any position between the flange 16ᵇ and the expanding shoe or inner clamping member 18, the bolt 21 is first rotated in a direction to give the tapered collar 20 a movement endwise in the direction of its larger end to the position shown in Fig. 3, to release or permit the contracting or collapsing of the inner clamping member or split ring by allowing the adjacent ends of the latter to spring toward each other. The peripheral wall of the flexible coupling member 14 is then inserted or adjusted to the proper position between the peripheral wall or flange 16ᵇ and the inner clamping member 18. Then by rotating the bolt in the opposite direction the collar 20 will be drawn endwise in the direction of its smaller end and toward the disk 16 (see Fig. 4), which movement expands the clamping member or split ring 18 and securely holds the flexible sleeve or peripheral wall of the flexible member 14 between said inner clamping member and the flange 16ª.

The flexibility of the coupling is obtained through the pliable character of the sleeve 14, which obviously will adjust itself to any discrepancy or variations in parallelism or alinement of the shafts, without materially affecting the proper transmission of power from the driving to the driven shaft.

This type of flexible coupling has a particular advantage when used to couple the armature of a magneto to the cam shaft of an automobile engine, in that it greatly simplifies the operation of properly setting the magneto to the stroke of the engine. By simply loosening the expanding shoe 18 through the medium of the bolt 21, the sleeve 14 is disconnected and the driven shaft 11 may be turned to any position and the sleeve again connected by tightening the expansion shoe or inner clamping member 18.

A flexible coupling of this type may be constructed in several forms, without departing from the spirit of this invention, therefore I do not wish to be understood as limiting my invention otherwise than as stated in the appended claims.

I claim:

1. In a flexible coupling, the combination with a driving and a driven shaft, of a disk mounted upon the extremity of one of said shafts and provided with an inwardly facing bearing surface, a collar mounted upon the extremity of the other of said shafts, a cup shaped flexible sleeve secured to said collar throughout its inwardly extending portions, and having its annular marginal portion engaging the bearing surface of said disk, said flexible sleeve and disk forming a chamber, a clamping member mounted within said chamber for clamping said marginal portion of said sleeve against the bearing surface of said disk, and means extending outwardly through the face of said disk for operating said clamping member.

2. In a flexible coupling, the combination with a driving and a driven shaft, of a disk mounted upon the extremity of one of said shafts and provided with an annular inwardly facing bearing surface, a collar mounted upon the extremity of the other of said shafts, said collar having a diameter less than that of said disk, a cup shaped flexible sleeve having the inwardly extending portion embracing and secured to the outer face of said collar, and its annular marginal portion engaging the bearing surface of said disk, a clamping member for clamping said flexible member to said disk member and inclosed by said disk and flexible coupling member, for operating said clamping member extending outwardly through the face of said disk.

3. In a flexible coupling, the combination with a driving shaft and a driven shaft, of a disk mounted upon the extremity of one of said shafts, and provided with a peripheral flange, a collar mounted upon the extremity of the other of said shafts and having a diameter less than that of said disk, a flexible cup shaped sleeve the inwardly extending portion thereof being provided with a central aperture, the marginal portions adjacent to said aperture embracing the outer surface of said collar and secured thereto, an expansible clamping member mounted within said flange of the disk and forming therewith a space adapted to receive the annular marginal portion of said flexible sleeve, and means for expanding said clamping member, extending outwardly through the face of said disk.

4. In a flexible coupling, the combination with a driving shaft and driven shaft, of a disk mounted upon the extremity of one of said shafts, said disk being provided with a peripheral flange, a collar mounted upon the extremity of the other of said shafts, having a diameter less than that of said disk, a flexible cup shaped sleeve having its inwardly extending portion embracing and secured to the outer surface of said collar, an annular expansible clamping member inclosed within said disk, collar, and flexible sleeve and concentric with said flange, said clamping member forming between it and the inner surface of said flange a space adapted to receive the marginal portion of said flexible sleeve, said clamping member comprising a split ring provided with a tapered seat adjacent to its end portions, a non-rotatable tapered collar within said seat, and a bolt extending through the face of the disk having screw-threaded engagement with said collar.

In testimony, that I, claim the foregoing as my invention I affix my signature in the presence of two witnesses, this 29th day of October A. D. 1912.

FRANK N. NUTT.

Witnesses:
A. L. TISCH,
J. H. JAY.